4/2/85 XR 4,508,936

United States Patent [19]

Ingalls

[11] Patent Number: 4,508,936

[45] Date of Patent: Apr. 2, 1985

[54] LOCAL EXTERNAL COMMUNICATION SYSTEM

[75] Inventor: Robert Ingalls, Epping, N.H.

[73] Assignee: Gentex Corporation, Carbondale, Pa.

[21] Appl. No.: 375,673

[22] Filed: May 6, 1982

Related U.S. Application Data

[63] Continuation-in-part of Ser. No. 169,419, Jul. 16, 1980, abandoned.

[51] Int. Cl.[3] .......................... H04R 1/08; H04M 1/05; A62B 18/00

[52] U.S. Cl. .......................................... 179/82; 73/652; 128/201.19; 381/87; 179/121 C; 179/121 T; 179/157

[58] Field of Search .................... 179/1 C, 1 H, 1 HF, 179/1 MG, 1 MN, 1 P, 1 SH, 1 ST, 1 UW, 1 VE, 2 C, 82, 121 C, 121 T, 156 R, 156 A, 157, 183, 184, 187, 188, 100 L; 455/41; 128/201.19; 181/158; 381/54, 56, 67, 71, 75, 86, 94, 87; 73/652, 654

[56] References Cited

U.S. PATENT DOCUMENTS

| | | | |
|---|---|---|---|
| 2,123,196 | 7/1938 | Millard | 179/157 |
| 2,165,856 | 7/1939 | Howey | 179/2 C |
| 2,847,506 | 8/1958 | Gray et al. | 179/2 C |
| 3,180,333 | 4/1965 | Lewis | 128/201.19 |
| 3,181,531 | 5/1965 | Angioletti | 128/201.19 |
| 3,310,736 | 3/1967 | Bayly et al. | 179/82 X |
| 3,374,230 | 10/1967 | Cupp | 179/156 R |
| 3,659,056 | 4/1972 | Morrison et al. | 179/82 |
| 3,736,379 | 5/1973 | Kagan | 179/2 C |
| 3,764,748 | 10/1973 | Branch et al. | 179/107 E |
| 4,010,334 | 3/1977 | Demeter | 179/121 C |
| 4,072,831 | 2/1978 | Joscelyn | 179/188 |
| 4,258,229 | 3/1981 | Eggert et al. | 179/121 C |

FOREIGN PATENT DOCUMENTS

| | | | |
|---|---|---|---|
| 2703781 | 8/1978 | Fed. Rep. of Germany | 381/67 |
| 57-13323 | 1/1982 | Japan | 73/652 |
| 2081550 | 2/1982 | United Kingdom | 128/201.19 |
| 323706 | 2/1972 | U.S.S.R. | 73/652 |

*Primary Examiner*—Keith E. George

*Attorney, Agent, or Firm*—Shenier & O'Connor

[57] ABSTRACT

A local external communication system for use by a person wearing a mask covering the nose and mouth and in sealing engagement with the face in which an assembly secured to the outer surface of the mask without in any way affecting the integrity of the mask seal generates an output signal in response to the wearer's voice. The output signal is fed to a speaker carried on the wearer's body to produce an output which is audible to other persons in the vicinity of the wearer.

10 Claims, 6 Drawing Figures

LOCAL EXTERNAL COMMUNICATION SYSTEM

CROSS-REFERENCE TO RELATED APPLICATION

This application is a continuation-in-part of my copending application Ser. No. 169,419, filed July 16, 1980 now abandoned.

FIELD OF THE INVENTION

This invention relates to the field of communication devices and, more particularly, to a system for providing a person wearing a mask with local external communication capability without in any way affecting the effectiveness of the mask in performing its primary function.

BACKGROUND OF THE INVENTION

There are known in the prior art masks for use by persons working in contaminated or polluted atmospheres. Usually these masks cover both the nose and mouth of the wearer and by one expedient or another permit him to breath while working in the contaminated or polluted atmosphere without harm.

It is often desirable that a person wearing a mask of the type described above be able to communicate with other persons in the same locality, whether they be persons wearing masks and working in the polluted atmosphere, or a person or persons in the same general area but outside the polluted area. With masks of the prior art which are not provided with some built-in communication system, such local external communication is not possible without removing the mask, thus defeating its purpose.

Masks of the type described above, are subject to relatively stringent regulations imposed by various governmental bodies to ensure that persons wearing the masks are fully protected. Any proposed change in the design of an existing mask requires the approval of these regulatory bodies before the change can be incorporated in the mask itself. While such approval is highly desirable for the protection of the person using the mask, it consumes time and results in an expense to the manufacturer proposing the design change.

SUMMARY OF THE INVENTION

One object of my invention is to provide a local external communication system for a person wearing a mask covering his nose and mouth.

Another object of my invention is to provide a local external communication system for a mask covering the nose and mouth of the wearer, which system will not interfere with the effectiveness of the mask in performing its primary function.

Still another object of my invention is to provide a local external communication system which can readily be applied to an existing mask without deleteriously affecting the integrity thereof.

A still further object of my invention is to provide a local external communication system which can be applied to a mask without involving a design change of the mask which would require approval of regulatory bodies.

Other and further objects of my invention will appear from the following description:

In general my invention contemplates the provision of a local external communication system for use by a person wearing a mask covering the nose and mouth and in sealing engagement with the face, in which an assembly secured to the outer surface of the mask without in any way affecting the integrity of the seal provided thereby generates an output signal in response to the wearer's voice, which signal is fed to a speaker carried on the wearer's body to cause the speaker to produce an output which is audible to other persons in the vicinity of the wearer, thus to afford the wearer with local external communication capability without removing the mask and without in any way affecting the integrity of the mask seal. In one form of my invention, the external assembly includes a vibration pick-up in which the signal is generated by vibrations of the mask itself when the wearer speaks. In another form of my invention, a pick-up secured to the inner surface of the mask without in any way affecting the integrity of the mask seal is magnetically coupled to an external pick-up which generates the signal fed to the speaker.

BRIEF DESCRIPTION OF THE DRAWINGS

In the accompanying drawings to which reference is made in the instant specification and which are to be read in conjunction therewith and in which like reference numerals are used to indicate like parts of the various views.

DESCRIPTION OF THE PREFERRED EMBODIMENT

Figure 1:
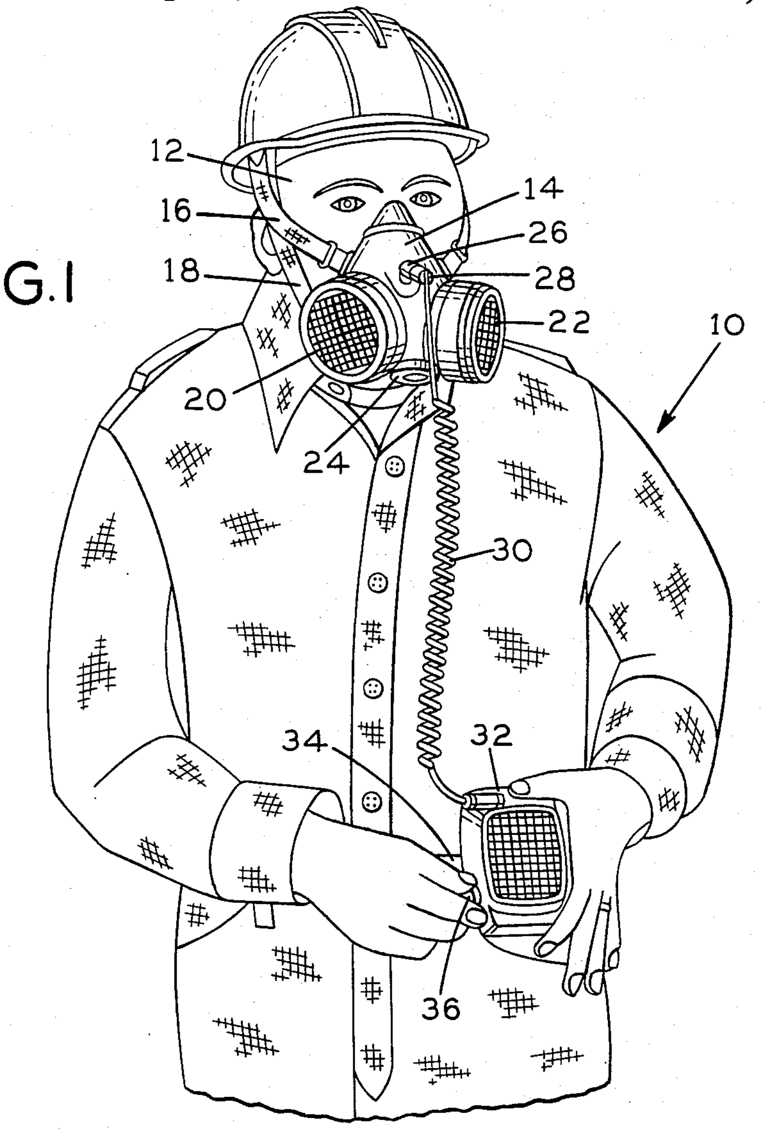
FIG. 1 is a fragmentary perspective view of a person wearing a mask provided with my local external communication system.

Referring now to FIG. 1, a man indicated generally by the reference character 10 having a head 12 is wearing a mask 14 provided with means, such as straps 16 and 18, which secure the mask in position on the head 12. One form of mask which may be used includes a pair of intake elements 20 and 22 through which contaminated air is drawn. In the course of passage through the intakes 20 and 22, the air is decontaminated in a manner known to the art, so that it may safely be inhaled by the man 10. The mask further is provided with an outlet 24 through which the man may exhale but which does not permit any contaminated air to be drawn in. Further as is known in the art, around its periphery the mask 14 forms a seal with the face of the man, so as to prevent contaminated air from seeping in around the edge of the mask. The outer surface of the mask 14 carries a receptacle 26 secured to the surface in a manner to be described. Receptacle 26 receives an external communication element 28 which may be inserted in the receptacle 26 with a friction fit, for example. As will be more fully explained hereinbelow, the element 28 is adapted to produce an output signal when the man 10 speaks. This signal is carried by a connecting cord 30 to a speaker box 32 which may, for example, be clipped to the belt 34 worn by the man 10. The speaker box 32 is provided with a knob 36 which may be turned to provide an on-off and volume control.

Figure 2:
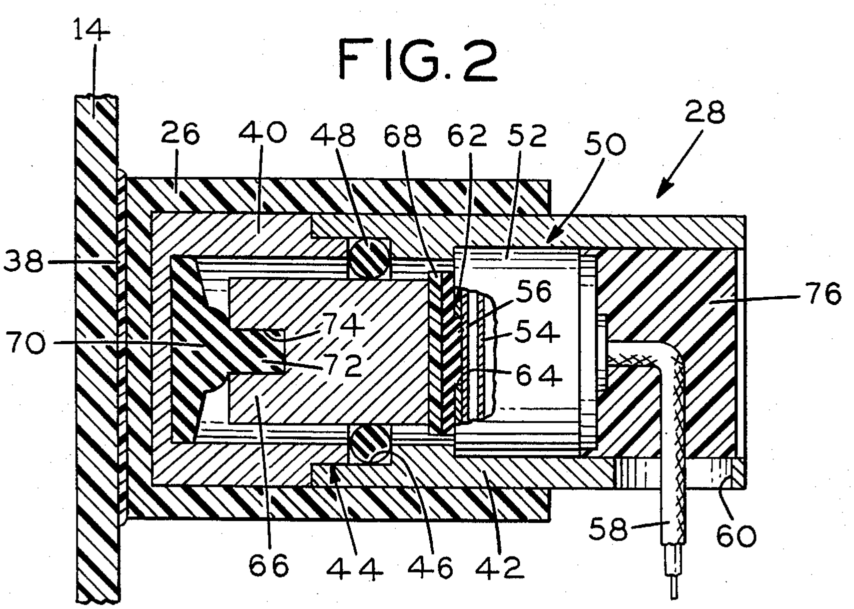
FIG. 2 is a fragmentary sectional view of a portion of a mask and of one form of the signal-producing assembly of my local external communication system.

Referring now to FIG. 2, the receptacle 26 may be secured to the outer surface of mask 14 by means of a suitable adhesive 38, which bonds the receptacle 26 to the mask without any way affecting the integrity of the mask. The first form of the voice responsive signal-producing device indicated generally by the reference character 28 of my local external communication system includes an inner housing part 40 and an outer housing part 42, which may be secured to each other by a bond indicated generally by the reference character 44, so as to leave a recess 46 in which I dispose an O-ring 48. The outer housing portion 42 is counterbored, so as to receive an electret microphone assembly indicated generally by the reference character 50 including a housing 52, which receives an electret 54 and a diaphragm 56 extending over an audio opening 64 in the base of the housing 52. A coaxial cable 58 which carries the output signal to the line 30 extends through a opening 60 in the wall of the upper housing portion 42. My assembly 28 includes a silicone rubber contact 62, a portion of which extends through the audio opening 64 and into engagement with the diaphragm 56.

I secure one end of a metal slug 66 extending through O-ring 48 to the contact 62 by means of a layer 68 of a suitable plastic, such for example as "Cycolac", which is the registered trademark of Marbon Chemical Division of Borg Warner Corp. of Gary, Indiana, for a high-impact-styrene-type, rigid, thermoplastic resin. This material is particularly suited for this purpose in that it provides a good hard, flat interface between the surface of the end of the metal slug 66 and the rubber contact 62.

I position a foot 70 of a suitable material, such as silicone rubber in the base of housing section 40. Foot 70 has an extension 72 disposed in a recess 74 in the slug 66. After the parts of the unit 28 have been assembled in the housing sections 40 and 42, potting compound 76 may be poured into the open end of housing section 42 to hold the parts in place.

In operation of the form of my signal-producing device 28 just described, when the person 10 wearing the mask 14 speaks, the material of which the mask is made and the assembly 28 secured thereto vibrate. Owing to the inertia of the mass 66, the vibration will produce relative movement between the mass and the microphone housing 52, which will be transmitted by the diaphragm 56 to the electret element 54. As is known in the art, there may be incorporated in the housing 50 an amplifier which, in response to the vibration applied to the electret element 54 by the diaphragm 56, will generate an audio output signal. This signal travels over the conductor 30 to the speaker box 32 where it may again be amplified, so as to be audible to a person in the vicinity of the man 10 wearing the mask 14.

Figure 3:
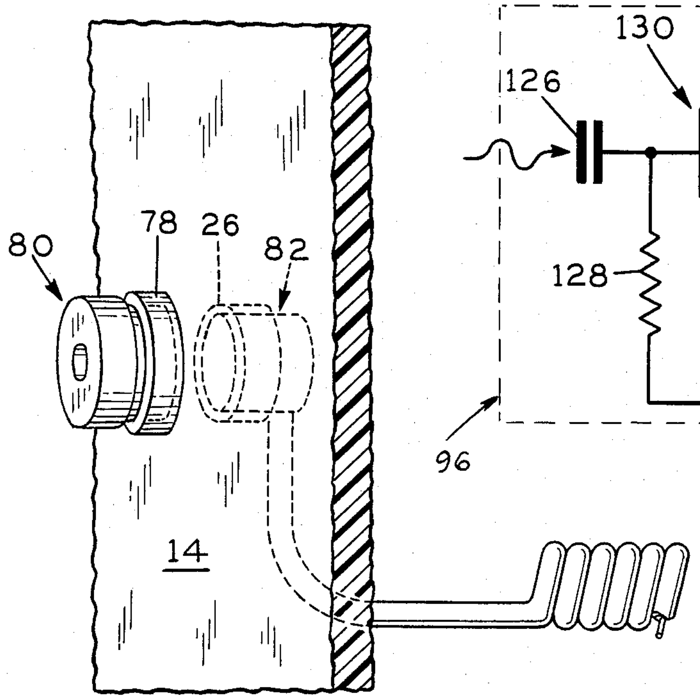
FIG. 3 is a fragmentary perspective view of a portion of a mask provided with an alternate form of the signal generating portion of my local external communication system.
Figure 5:
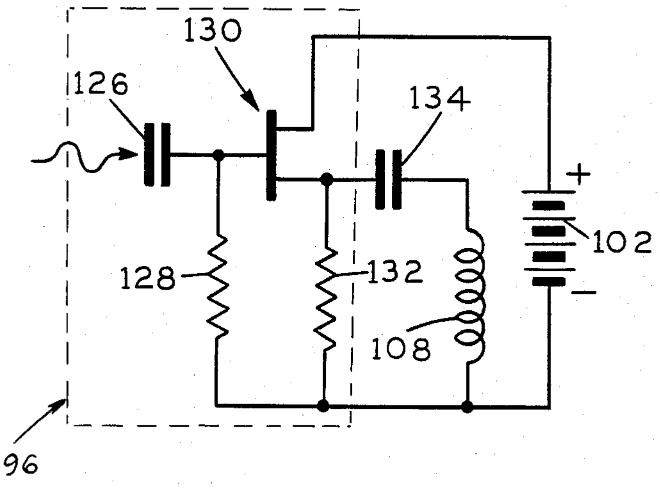
FIG. 5 is a schematic view of a portion of the electrical circuitry of the form of my signal generating unit illustrated in FIGS. 3 and 4.
Figure 4:
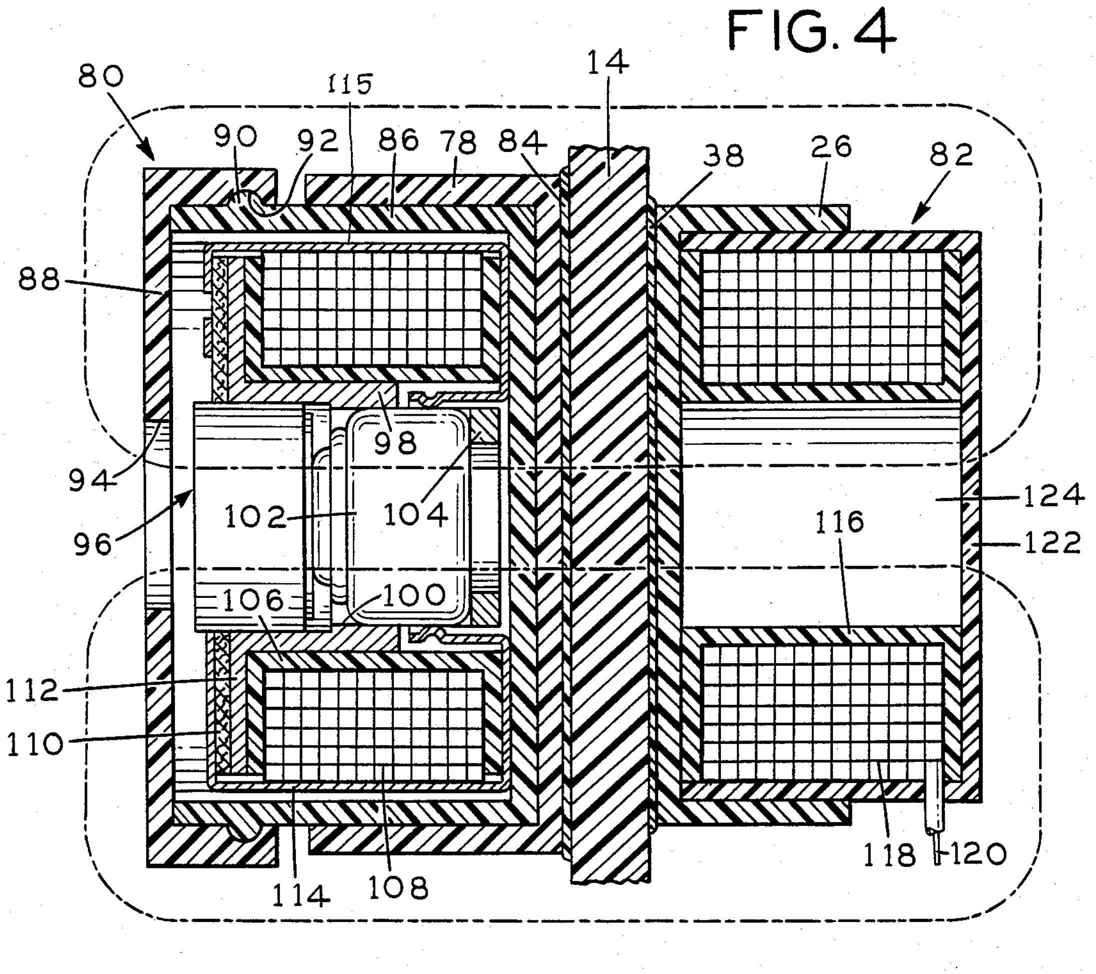
FIG. 4 is a fragmentary sectional view of the form of my local external communication system shown in FIG. 3 and drawn on an enlarged scale.

Referring now to FIGS. 3 to 5, in an alternate embodiment of the signal-producing portion of my local external communication system, I secure a receptacle 78 similar to the receptacle 26 to the interior of the mask 24 at a location corresponding to the location of the receptacle 26 by use of any suitable adhesive which bonds the receptacle to the inner surface of the mask 14 without in any way affecting the integrity of the mask in preventing outside gas from directly entering the space enclosed by the mask.

In the form of my signal-producing arrangement illustrated in FIGS. 3 to 5, receptacle 78 receives a flux generating assembly indicated generally by the reference character 80 with a friction fit, or the like. Receptacle 26 receives a flux pick-up assembly indicated generally by the reference character 82 with a friction fit.

As has been pointed out hereinabove, a suitable adhesive 84 may be used to secure receptacle 78 to the inner surface of the mask 14. Assembly 80 includes a housing 86 formed of a suitable synthetic resin and adapted to receive a cover 88 held in position over the open inner end of the housing 86 by means of a bead 90, which snaps into a recess 92 in the cover. Cover 88 is provided with a centrally located opening 94 to permit vibrating air to enter the housing.

The assembly 80 includes an electret microphone assembly indicated generally by the reference character 96, which is received in a flanged spacer sleeve 98 having a bore portion 100 which receives a battery 102 for powering the assembly 96. Battery 102 rests on a rubber washer 104 which is received on the sleeve 98.

A bobbin 106 formed of a suitable plastic material receives an annular winding 108 adapted to be energized in a manner to be described to generate a magnetic flux. I mount the circuit board 110 carrying elements to be described more fully hereinbelow on the flange 112 of the spool 98. Contact clips 114 and 115 which extend around the coil 108 from the circuit board 110 around and into contact with the battery 102 completes the flux generating device 80.

The pick-up 82 supported in the receptacle 26 on the outside of the mask 14 includes a spool 116 carrying an annular winding 118 having an output conductor 120, which extends outwardly from a housing 122 covering the spool. Preferably, I place a slug 124 of magnetic material in the core of spool 116. It will readily be appreciated that, if desired, I might incorporate an amplifier in the structure housed by housing 122.

Referring now to FIG. 5, the circuit board 110 includes an electret microphone assembly 96 which, in the same housing, contains an FET amplifier 130 with major components consisting of a gate resistor 128 and source resistor 132. The signal generated by the microphone 96 is coupled by a capacitor 134 to the winding 108.

Figure 6:
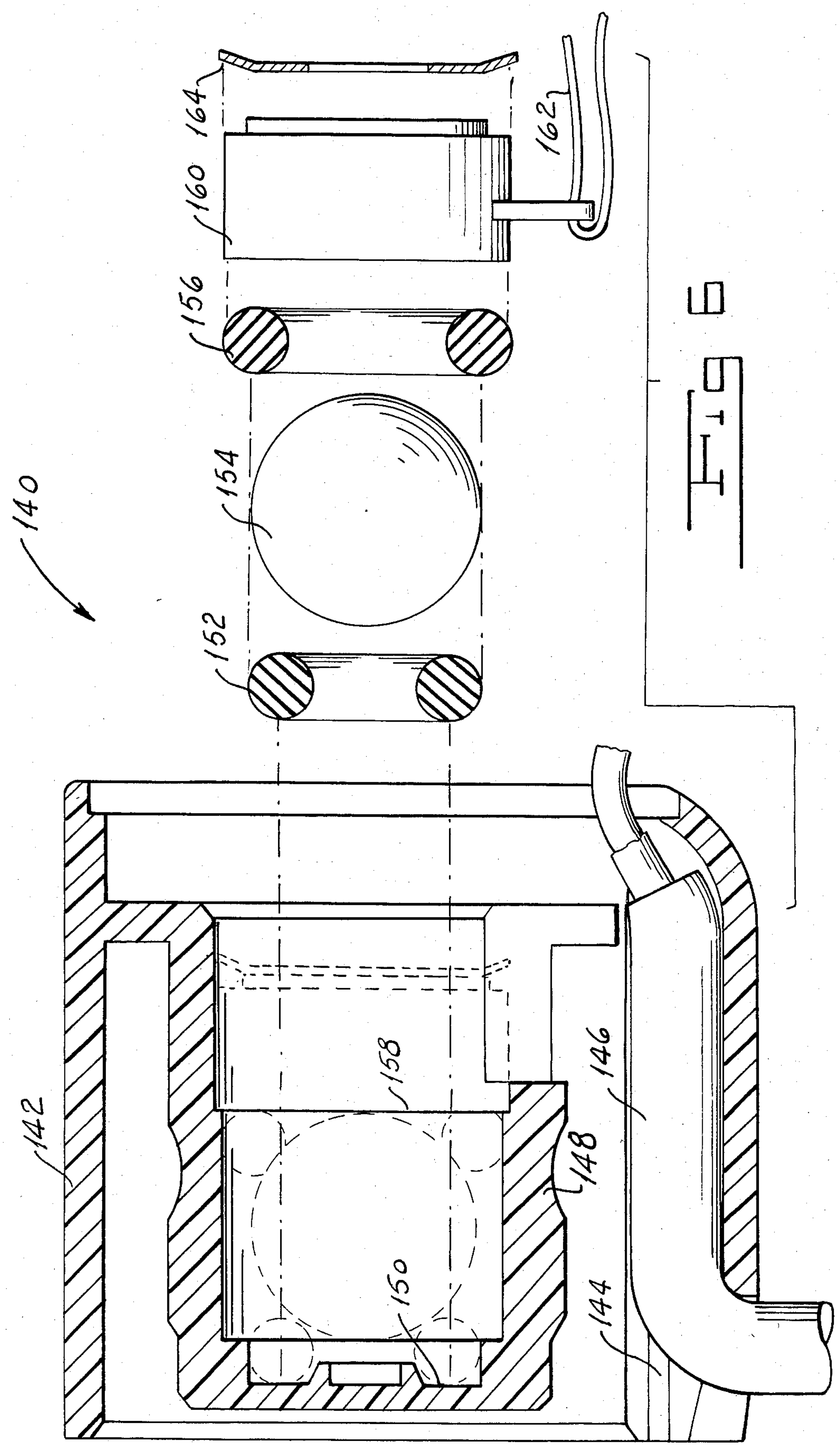
FIG. 6 is an exploded view of an alternate embodiment of the vibratory pick-up of my local external communication system.

Referring now to FIG. 6, an alternate embodiment of vibration pick-up, indicated generally by the reference character 140 which may be used with my local external communication system includes a housing 142 which may be molded from any suitable synthetic resin for example. Housing 142 is formed with a channel 144 for receiving the output cable 146 of the pick-up. I form the housing 142 with an internal sub-housing 148 the base of which is provided with a seat 150 for receiving an O-ring 152. O-ring 152 receives an aluminum ball 154. After having positioned the ball 154 within the sub-housing, I insert a second O-ring 156 in the sub-housing 148 over the ball 154. Next, I insert the microphone assembly 160 and seat it on a shoulder 158 formed in the housing. A resilient retaining ring 164 pushed into the housing holds the parts in position. In the course of assembling the parts of the unit 140 leads 162 are electronically connected to the cable 146. With the assembly complete, potting compound may be applied as necessary or desirable.

The arrangement of FIG. 6 has the advantage over that of FIG. 2 in that it uses a number of standard off-the-shelf elements such as O-rings 152 and 156 and ball 154. The O-rings 152 and 154 support the ball for vibratory movement so as to actuate the microphone. The O-rings 152 and 154 correspond to elements 70 and 48 while ball 154 corresponds to element 66 of FIG. 2. The microphone assembly 160 is substantially the same as assembly 50.

In operation of the form of my signal-producing arrangement illustrated in FIGS. 3 to 5, when the wearer of the mask speaks, the resultant vibrations cause the electret microphone assembly 96 to produce a signal which is amplified by the amplifier 130 and applied to winding 108. As a result, there is generated a variable magnetic flux indicated generally by the broken lines of FIG. 4, which extends through the material of the mask 14 without in any way affecting the normal function thereof and which couples the winding 118 to generate a varying electrical signal therein. Conductor 120 carries this signal to the lead 30 which applies the signal to the speaker assembly 32 as an input. As a result, the speaker produces an output which is audible to those in the vicinity of the person 10 wearing the mask 14.

It will be seen that I have accomplished the objects of my invention. I have provided a local external communication system for a mask or the like, which permits a person wearing the mask to communicate with persons in the same general area without the necessity of removing his mask. My local external communication system can be applied to any mask without in any way affecting the normal function of the mask in excluding contaminated or polluted air from the space within the mask.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A combined mask and local external communication system adapted to be applied to said mask as a retrofit including in combination a mask adapted to enclose the mouth of a wearer and having a wall of generally uniform thickness comprising a portion with continuous inner and outer surfaces, an assembly comprising a first coil and a microphone, means for adhering said assembly to the inner surface of said mask wall portion without piercing said wall, means including said microphone for producing a first electrical signal in response to the wearer's voice, means for applying said first electrical signal to said first coil to cause said first coil to produce a magnetic flux passing through said mask, a second coil, means for adhering said second coil to the outer surface of the mask wall portion without piercing said wall and at a location at which it is subjected to the action of said flux to produce a second electrical signal representative of the voice of the wearer without adversely affecting the integrity of the mask, a speaker carried on the person of the wearer, and means for applying said second signal to said speaker.

2. A combined mask and communication system adapted to be applied to said mask as a retrofit including in combination a mask adapted to enclose the mouth of a wearer and having a wall of generally uniform thickness comprising a portion with continuous inner and outer surfaces, an assembly comprising a first coil and a microphone, means for adhering said assembly to the inner surface of said mask wall portion without piercing said wall, means including said microphone for producing a first signal in response to the wearer's voice, means for applying said first electrical signal to said first coil to cause said first coil to produce a magnetic flux passing through said mask, a second coil, and means for adhering said second coil to the outer surface of said mask wall portion without piercing said wall and at a location at which it is subjected to the action of said flux to produce a second electrical signal representative of the voice of the wearer without adversely affecting the integrity of the mask.

3. A vibration pick-up for producing an output signal in response to vibration of a body including in combination, a housing adapted to contact said body to receive vibrations therefrom, a slug, first resilient means mounting said slug in said housing for movement relative thereto, the relative masses of said slug and said housing being such that said slug tends to remain stationary when said housing vibrates, a microphone having a diaphragm, means mounting said microphone in said housing, and second resilient means coupling said slug to said diaphragm to cause said microphone to produce an output signal in response to vibration of said housing.

4. A local external communication system for use with a mask adapted to enclose the mouth of a wearer and having an outer surface including in combination, a housing, means mounting said housing on said outer surface to receive vibrations directly therefrom, a slug, first resilient means mounting said slug in said housing for movement relative thereto, the relative masses of said slug and said housing being such that said slug tends to remain stationary when said housing vibrates, a microphone having a diaphragm, second resilient means coupling said slug to said diaphragm to cause said microphone to produce an output signal in response to movement of said slug relative to said housing resulting from vibration of said mask induced by the voice of the wearer, a speaker supported on the person of the wearer, and means conducting said signal to said speaker.

5. A combined mask and local external communication system including in combination a mask adapted to enclose the mouth of a wearer and having a wall of generally uniform thickness comprising a portion with a continuous outer surface, a housing, means mounting said housing on said surface to receive vibrations directly therefrom, a slug, resilient means mounting said slug in said housing for movement relative thereto, the relative masses of said slug and said housing being such that said slug tends to remain stationary when said housing vibrates, means including a microphone responsive to relative movement between said slug and said housing resulting from vibration of said mask induced by the voice of the wearer for producing an electrical signal representative of the voice of the wearer without adversely affecting the integrity of the mask, a speaker supported on the person of the wearer and means for conducting said signal to said speaker.

6. A combined mask and local external communication system including in combination a mask adapted to enclose the mouth of a wearer and having a wall of generally uniform thickness comprising a portion with a continuous outer surface, a housing, means mounting said housing on said outer surface for receiving vibrations directly therefrom, a slug, means mounting said slug in said housing for movement relative thereto, the relative masses of said slug and said housing being such that said slug tends to remain stationary when said housing vibrates, means responsive to relative movement between said slug and said housing resulting form vibration of said mask induced by the voice of the wearer for producing an electrical signal representative of the voice of the wearer without adversely affecting the intregrity of the mask, a speaker supported on the person of the wearer and means for conducting said signal to said speaker.

7. A combined mask and local external communication system adapted to be applied to said mask as a retrofit including in combination a mask having a wall of generally uniform thickness and adapted to enclose the mouth of a wearer and comprising a portion with continuous inner and outer surfaces, means adapted to produce a varying magnetic field in response to acoustical vibrations applied thereto, means adhering said field producing means to the inner surface of said mask wall portion without piercing said wall and at a location at which it is subject to the voice of the wearer, a pick-up adapted to produce an output signal in response to variations in magnetic flux passing therethrough, and means adhering said pick-up to the outer surface of said mask wall portion without piercing said wall and at a location adjacent to the location of said field producing means whereby flux generated by said field producing means causes said pick-up to produce an output signal representative of the voice of the wearer without adversely affecting the integrity of the mask.

8. A combined mask and local external communication system adapted to be applied to said mask as a retrofit including in combination, a mask having a wall of generally uniform thickness adapted to enclose the mouth of the wearer and comprising a portion with continuous inner and outer surfaces, voice responsive means adapted to produce a varying electromagnetic field in response to acoustical vibrations applied thereto, means adhering said voice responsive means to the inner surface of said mask wall portion without piercing said wall and at a location at which it is subject to the voice of the wearer to produce said electromagnetic field extending through said mask to a location outside said mask, a pick-up device adapted to produce an output signal in response to said electromagnetic field and means adhering said pick-up to said outer surface at said location without piercing said wall to cause said pick-up to produce an output signal representative of the voice of the wearer without adversely affecting the integrity of the mask.

9. A combined mask and local external communication system adapted to be applied to said mask as a retrofit including in combination, a mask having a wall of generally uniform thickness adapted to enclose the mouth of the wearer and comprising a portion with continuous inner and outer surfaces, voice responsive means adapted to produce a varying electromagnetic field in response to acoustical vibrations applied thereto, means adhering said voice responsive means to the inner surface of said mask wall portion without piercing said wall and at a location at which it is subject to the voice of the wearer to produce said electromagnetic field extending through said mask to a location outside said mask, a pick-up device adapted to produce an output signal in response to said electromagnetic field, means adhering said pick-up to the outer surface of said mask without piercing said wall and at said location to cause said pick-up to produce an output signal representative of the voice of the wearer without adversely affecting the integrity of the mask, a speaker carried on the wearer's body and means for applying said output signal to said speaker.

10. A vibration pick-up for producing an output signal in response to vibration of a body including in combination a housing having a generally cylindrical inner wall and a base, said housing adapted to contact said body to receive vibrations therefrom, a ball having a diameter less than that of said inner wall, a first O-ring between said base and said ball, a second O-ring between said base and said ball, a second O-ring between said wall and said ball, the relative masses of said ball and said housing being such that said ball tends to remain stationary when said housing vibrates, said O-rings resiliently supporting said ball in said housing, a microphone having a diaphragm and means mounting said microphone in said housing with said diaphragm positioned to be acted upon by said ball.

* * * * *